United States Patent
Reddy et al.

(10) Patent No.: US 9,339,752 B2
(45) Date of Patent: May 17, 2016

(54) CONFIGURATIONS AND METHODS OF $CO_2$ CAPTURE FROM FLUE GAS BY CRYOGENIC DESUBLIMATION

(71) Applicant: FLUOR TECHNOLOGIES CORPORATION, Aliso Viejo, CA (US)

(72) Inventors: Satish Reddy, Laguna Beach, CA (US); Joseph Yonkoski, Irvine, CA (US); Paul Mathias, Aliso Viejo, CA (US)

(73) Assignee: Fluor Technologies Corporation, Sugar Land, TX (US)

( * ) Notice: Subject to any disclaimer, the term of this patent is extended or adjusted under 35 U.S.C. 154(b) by 335 days.

(21) Appl. No.: 13/940,019

(22) Filed: Jul. 11, 2013

(65) Prior Publication Data

US 2014/0090415 A1 Apr. 3, 2014

Related U.S. Application Data

(60) Provisional application No. 61/670,427, filed on Jul. 11, 2012.

(51) Int. Cl.
| | |
|---|---|
| *F25J 3/00* | (2006.01) |
| *F25J 1/00* | (2006.01) |
| *B01D 53/00* | (2006.01) |
| *B01D 7/02* | (2006.01) |
| *F25J 3/06* | (2006.01) |
| *B01D 7/00* | (2006.01) |

(52) U.S. Cl.
CPC ............... *B01D 53/002* (2013.01); *B01D 7/00* (2013.01); *B01D 7/02* (2013.01); *F25J 3/067* (2013.01); *B01D 2257/504* (2013.01); *B01D 2258/0283* (2013.01); *F25J 2205/20* (2013.01); *F25J 2210/70* (2013.01); *Y02C 10/12* (2013.01); *Y02P 70/34* (2015.11)

(58) Field of Classification Search
CPC .......... B01D 53/002; B01D 7/00; B01D 7/02; B01D 2258/0283; B01D 2257/054; Y02C 10/12; F25J 3/067; F25J 2205/20; F25J 2210/70
See application file for complete search history.

(56) References Cited

U.S. PATENT DOCUMENTS

| | | | | | |
|---|---|---|---|---|---|
| 2,579,421 | A | * | 12/1951 | Egan ....................... | C10G 31/06 62/335 |
| 2,738,658 | A | * | 3/1956 | Brouson ................. | C01B 31/22 62/604 |

(Continued)

FOREIGN PATENT DOCUMENTS

| | | |
|---|---|---|
| DE | 60204540 | 3/2006 |
| FR | 2867092 | 9/2005 |

(Continued)

*Primary Examiner* — Frantz Jules
*Assistant Examiner* — Keith Raymond
(74) *Attorney, Agent, or Firm* — Conley Rose, P.C.; Kristin Jordan Harkins

(57) ABSTRACT

Systems and methods of $CO_2$ desublimation are presented in which refrigeration content is retained within the system. Most preferably, refrigeration content is recycled by providing the refrigeration content of a $CO_2$-lean feed gas to the $CO_2$-containing feed gas and to pre-cooling of a desublimator, and/or by providing refrigeration of effluent of a desublimator in regeneration to a refrigerant in a closed refrigeration cycle for deep-cooling of another desublimator.

9 Claims, 4 Drawing Sheets

(56) References Cited

U.S. PATENT DOCUMENTS

| | | |
|---|---|---|
| 4,265,088 A | 5/1981 | Funk |
| 4,378,984 A | 4/1983 | Cheng |
| 2004/0148961 A1* | 8/2004 | Clodic .............. B01D 53/002 62/532 |
| 2008/0302133 A1* | 12/2008 | Saysset ............ B01D 53/002 62/617 |
| 2011/0023537 A1* | 2/2011 | Assink ................ B01D 7/02 62/617 |
| 2011/0226010 A1 | 9/2011 | Baxter |
| 2012/0174623 A1* | 7/2012 | Clodic ................ B01D 7/02 62/617 |

FOREIGN PATENT DOCUMENTS

| | | |
|---|---|---|
| WO | 2009047341 | 4/2009 |
| WO | 2012068588 | 5/2012 |
| WO | 2012174418 | 12/2012 |

\* cited by examiner

US 9,339,752 B2

CONFIGURATIONS AND METHODS OF $CO_2$ CAPTURE FROM FLUE GAS BY CRYOGENIC DESUBLIMATION

This application claims priority to U.S. provisional application with the Ser. No. 61/670,427, which was filed on Jul. 11, 2012, and which is incorporated by reference herein.

FIELD OF THE INVENTION

The field of the invention is systems and methods of $CO_2$ desublimation from flue gas and recovery thereof.

BACKGROUND OF THE INVENTION

The increasing carbon dioxide concentration in the atmosphere is suggested to be linked to increasing temperatures and changes in the World's climate, and significant interest has been given to $CO_2$ capture, especially from combustion gases. One well established $CO_2$ capture method uses a chemical solvent (typically amine based) to absorb $CO_2$ from flue gas. This method is effective, however presents several difficulties: (1) solvents must be manufactured, purchased, and transported, resulting in significant expenses; (2) most solvents (and especially amine solvents) tend to degrade via oxidative and/or thermal pathways. As a consequence the solvent must be maintained and/or continuously replaced; and (3) some solvents present environmental concerns as they may form harmful compounds once emitted to the atmosphere.

Other known $CO_2$ capture processes may circumvent at least some of these drawbacks, including PSA (pressure swing adsorption) or membrane processes. However, these processes are often costly because they carry energy penalties caused by the regeneration of $CO_2$ loaded adsorbents or by the need for recompression of flue gas upstream of a membrane.

$CO_2$ can also be removed from a gas stream based on the principles of cryogenic removal or desublimation. For example, U.S. Pat. Pub. No. 2011/0226010 teaches separation of $CO_2$ from flue gas by compression, expansion and refrigeration. While such process is at least conceptually attractive, significant energy requirements often render such separation impracticable. This and all other extrinsic materials discussed herein are incorporated by reference in their entirety. Also, where a definition or use of a term in an incorporated reference is inconsistent or contrary to the definition of that term provided herein, the definition of that term provided herein applies and the definition of that term in the reference does not apply.

In another example, as described in U.S. Pat. No. 4,265,088, $CO_2$ is frozen out from a gas stream, and so isolated solid $CO_2$ is then sublimated after it has been deposited in a tower. Such configuration, however, is typically not able to generate a pure $CO_2$ stream and requires in most cases substantial quantities of energy for $CO_2$ recovery. Similarly, U.S. Pub. No. 2011/0023537 teaches desublimation of $CO_2$ on porous media and $CO_2$ recovery via fluid $CO_2$ to so produce a warm porous medium. However, use of such porous media may be problematic due to potential clogging. Furthermore, $CO_2$ recovery using liquid $CO_2$ as described in the '537 reference is not energy efficient under various circumstances.

Thus, there is still a need for energy efficient systems and methods of capture of $CO_2$ from a flue gas by cryogenic desublimation, and a further need for the removal of the solid $CO_2$.

SUMMARY OF THE INVENTION

The present invention is directed to various configurations and methods of $CO_2$ removal with desublimation in which refrigeration content in the desublimation system is recycled within a $CO_2$ recovery plant and retained to a significant degree. Most preferably, contemplated plants operate with a plurality of desublimators that are fluidly coupled via valves and a control unit such as to allow each desublimator to operate in one of the following modes: a desublimation mode, a regeneration mode, a pre-cooling mode, and a deep-cooling mode.

In one preferred aspect of the inventive subject matter, a flue gas treatment plant includes a flue gas conditioning unit that cools flue gas in one or more heat exchangers, preferably using a cool $CO_2$ depleted flue gas to so produce a precooled flue gas at a low flue gas pressure. Contemplated plants further include a desublimation unit having multiple desublimators that are fluidly coupled to each other and the flue gas conditioning unit such that: (a) one desublimator receives the precooled flue gas from the flue gas conditioning unit and produces a cold $CO_2$-lean flue gas while solid $CO_2$ deposit in the desublimator; (b) another desublimator receives and is pre-cooled by the cold $CO_2$-lean flue gas and so forms the cool $CO_2$ depleted flue gas; (c) a further desublimator receives a warm liquid $CO_2$ stream at relatively high regeneration pressure to produce an effluent stream that includes at least some of the desublimated $CO_2$ (preferably in slurry form); and (d) yet another desublimator deep-cooled by a refrigeration cycle to a temperature at which $CO_2$ desublimates; and wherein the refrigeration cycle is thermally coupled to the effluent stream such that refrigeration content of the effluent stream cools a refrigerant in the refrigeration cycle.

It is further typically preferred that the flue gas conditioning unit also includes a second heat exchanger that cools the flue gas with residual refrigeration content of the cool $CO_2$ depleted flue gas leaving the first heat exchanger. Where desired or needed, the flue gas conditioning unit may further comprise a dehydration unit that removes water from the flue gas. Particularly suitable refrigeration cycles are closed refrigeration cycles, or semi-open cycle refrigeration cycles that use a portion of the cool $CO_2$ depleted flue gas as a refrigerant. Regardless of the nature of the cycle, it is also preferred that the refrigeration cycle includes a cross-heat exchanger that further cools the pressurized cooled refrigerant using refrigerant leaving the desublimator that is in deep-cooling mode.

Most typically, one or more of the desublimators contains structured packing, random packing, or a non-porous high surface area material. Additionally, it is preferred that the flue gas pressure is between 10 and 50 psia while the regeneration pressure is between 100-300 psia. Particularly preferred flue gas treatment plants will include a control system and a series of valves that are fluidly coupled to the plurality of desublimators to allow switching of an operational mode of at least one of the desublimators from a desublimation mode, a regeneration mode, a pre-cooling mode, or a deep-cooling mode to another one of the desublimation mode, the regeneration mode, the pre-cooling mode, and the deep-cooling mode.

Therefore, and viewed from a different perspective, the inventors also contemplate a method of treating flue gas in a flue gas treatment plant that includes a step of using a first desublimator to receive a precooled flue gas, and to produce solid $CO_2$ and a cold $CO_2$-lean flue gas (107) using desublimation. In another step, the cold $CO_2$-lean flue gas (107) is used to pre-cool a second desublimator to a temperature above desublimation temperature for $CO_2$, thereby forming a cool $CO_2$-depleted flue gas (108), and in yet another step, residual refrigeration content of the cool $CO_2$-depleted flue gas is used to cool a feed gas (101) to thereby form the precooled flue gas (106), wherein the first desublimator is deep-cooled using a refrigerant of a refrigeration cycle before the step of using the first desublimator, and wherein the refrigeration cycle is thermally coupled to a heat exchanger that cools the refrigerant in the refrigeration cycle using refrigeration content of stream within the flue gas treatment plant.

In especially preferred methods, the stream within the flue gas treatment plant is an effluent of a third desublimator, and most preferably, the effluent is a two-phase stream comprising liquid $CO_2$ and solid $CO_2$. It is still further preferred that solid $CO_2$ is removed from the first desublimator using a liquid $CO_2$ stream at a pressure and temperature (e.g., 100-300 psia; −10 to 40° C.) that does not allow for formation of gaseous $CO_2$. While not limiting to the inventive subject matter, the first desublimator is operated in at least some embodiments at a pressure of between 10-50 psia, and the flue gas and a stack gas leaving the flue gas treatment plant have a temperature of between 10-40° C.

Therefore, the inventors also contemplate a method of recycling refrigeration content in a desublimation flue gas treatment plant in which flue gas and a second desublimator are pre-cooled using refrigeration content of a cold $CO_2$-lean flue gas that leaves a desublimator to which the precooled feed gas (106) is fed. In another step, and before the first desublimator is operated in desublimation mode, the first desublimator is deep-cooled using a refrigerant of a refrigeration cycle, wherein the refrigerant is cooled by another desublimator effluent in the flue gas treatment plant (and most preferably an effluent of a desublimator in regeneration mode).

In especially preferred methods, the flue gas is pre-cooled in two separate heat exchangers, with the first heat exchanger cooling the feed gas to a temperature above 0° C., and the second heat exchanger cooling the feed gas to a temperature above a desublimation temperature for $CO_2$. Where desired or needed, the flue gas may be subjected to a dehydration step.

Various objects, features, aspects and advantages of the present invention will become more apparent from the following detailed description of preferred embodiments of the invention.

DETAILED DESCRIPTION

Figure 1A:
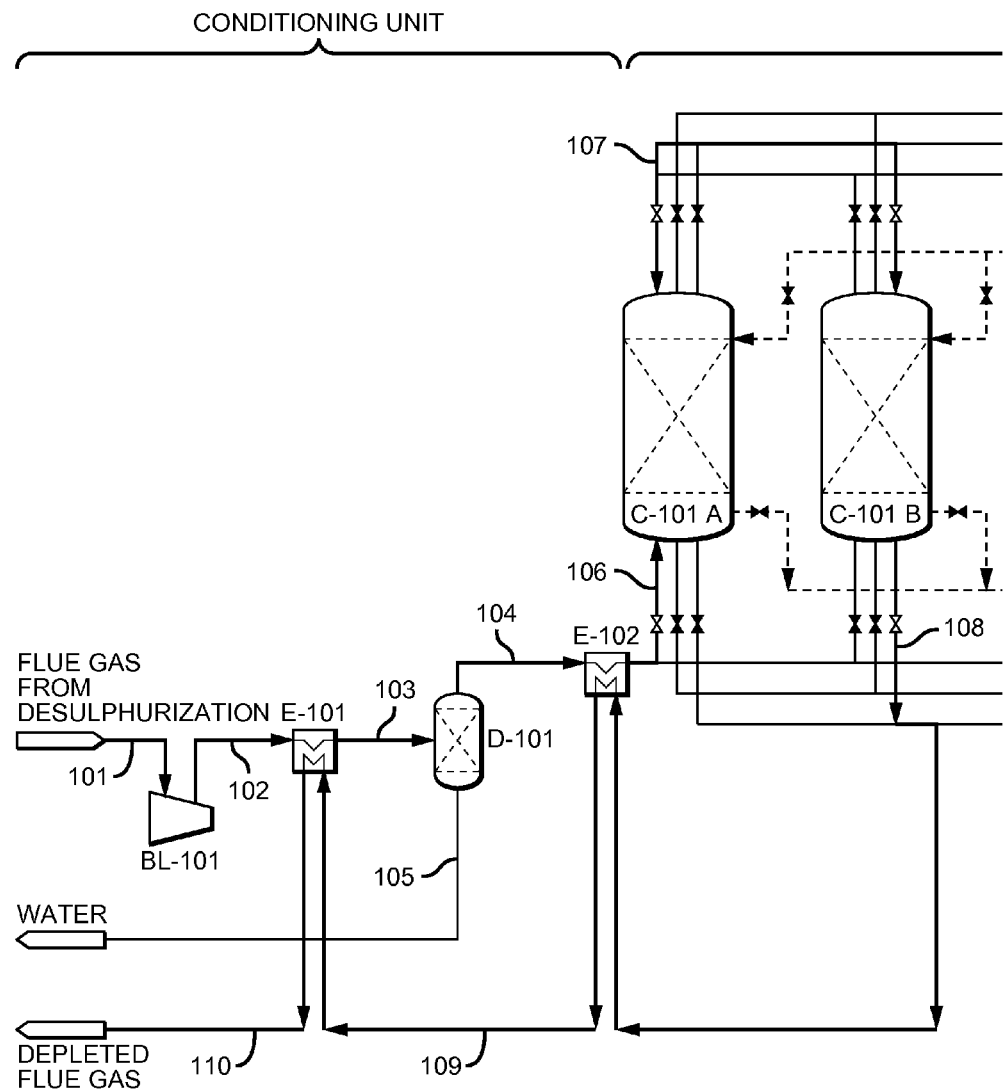
FIGS. 1A & 1B show one exemplary configuration of CO2 removal from a flue gas with integrated cold recovery.

The inventive subject matter is directed to various systems and methods for $CO_2$ removal from flue gas using desublimation that are particularly effective in the recovery of refrigeration content from streams within the system.

In general, contemplated systems and methods allow for $CO_2$ separation from flue gas as a result of differences in intrinsic thermodynamic properties between $CO_2$ and other components in the flue gas. More specifically, the inventors have developed systems and methods to capture solid $CO_2$ through desublimation at relatively low pressure, and recovery of the solid $CO_2$ via use of liquid $CO_2$ at relatively high pressure.

As the process of $CO_2$ desublimation is energy demanding, the inventors have developed systems and methods to recycle refrigeration content that allows substantially more economical operation. In one particularly preferred aspect, thermal integration between the flue gas entering the desublimators and the $CO_2$-lean effluent gas, and thermal integration between a deep cooling refrigeration cycle and a liquid $CO_2$ recovery stream provide substantial advantages as compared to heretofore known cryogenic processes. As a result, most or all of the input and output streams can be at about ambient temperature (e.g., 20° C.,±10° C.) as a large fraction of the refrigeration is recycled within the system.

In particularly preferred aspects of the inventive subject matter, desublimation of $CO_2$ is performed using a plurality of desublimation columns that are operated such that continuous pre-cooling, deep-cooling, desublimation, and/or regeneration for respective desublimation columns can be performed. As used herein, the terms "desublimation column" and "desublimator" are used interchangeably and denote the same device. Most typically, but not necessarily, systems and methods contemplated herein include at least four columns and associated piping such that one column can be operated as desublimator while the other columns can be subjected to pre-cooling, deep-cooling, and regeneration, respectively. It is moreover generally preferred that the systems and methods provided herein employ flue gas conditioning to remove water and reduce the temperature of the flue gas prior to entry of the cooled flue gas into the desublimator. As will be explained in more detail below, flue gas conditioning as well as pre-cooling is advantageously performed using residual refrigeration content of the flue gas exiting the desublimation column. To even further economize operation, refrigeration content of desublimated $CO_2$ is used to cool (partially or even entirely condense) a refrigerant of a preferably closed refrigeration cycle that is configured to deep-cool a desublimation column in preparation for desublimation.

With respect to flue gas conditioning it is generally preferred that the flue gas is boosted or pressurized and cooled prior to entering a desublimator, preferably using a booster/blower or a compressor. Most advantageously, cooling of the flue gas is accomplished via heat exchange with $CO_2$-lean flue gas produced by a desublimator (or a pre-cooling desublimator) and/or an external refrigerant. Optionally, refrigeration content may be derived from expansion of $CO_2$-lean flue gas as also further detailed below. Most typically, a dryer may be used to remove at least a portion (and preferably substantially all) of the water content (and other condensable components) from the flue gas. However, it should be noted that in a further aspect of the inventive subject matter, the flue gas is not completely dried before it enters the desublimator. In this case, it is preferred that water from the flue gas is mostly removed by cooling the flue gas below the dew point, followed by removal of the water in a subsequent knock-out drum. The water that remains in the flue gas will then desublimate in the $CO_2$ desublimator. The solid water is then melted by the warm $CO_2$ liquid, is entrained in the desublimator effluent stream, and can be recovered, for example, by a liquid dryer.

It should further be noted that the flue gas refrigeration will preferably be performed in multiple stages, with a first stage cooling the flue gas to a temperature above the freezing point of water (i.e., above 0° C.), which advantageously allows condensation of most of the water contained in the flue gas. A second stage can then be used to chill the dehydrated feed gas to a temperature below the freezing point of water but above the desublimation point of $CO_2$ (i.e., below 0° C. and above −100° C., more typically above −115° C. at about atmospheric pressure). Residual water content can be removed in various manners, including molecular sieves or glycol driers. Still further, it should be recognized that flue gas cooling is most preferably performed using refrigeration content from within the $CO_2$ desublimation system. Thus, suitable sources of refrigeration content include the $CO_2$-lean flue gas, refrigerant of the closed cycle refrigeration loop for deep-cooling, and $CO_2$ liquid for regeneration, preferably where the liquid is a two-phase liquid.

Most typically, the flue gas is a combustion gas of combustor of a turbine in a power production plant, but may also be a combustion gas from one or more boilers, heaters, or even exhaust gas from an incinerator or catalyst regenerator. Thus, the nature of suitable flue gases may vary considerably. However, it is generally preferred that the flue gas is produced in relatively significant quantities, for example, at a rate of at least 10 scfm, more typically at least 1,000 scfm, and most typically at least 10,000-100,000 scfm, and even higher. Based on the nature of the flue gas and prior treatment (e.g., desulfurization, $NO_x$ removal, particulate removal, etc.), chemical composition and temperature of the flue gas vary considerably. Thus, in most aspects of the inventive subject matter, the flue gas is pre-treated to remove one or more undesirable components (e.g., $SO_x$, $NO_x$, Hg, ash, other particulates, etc). In yet further contemplated aspects, it is preferred that the flue gas will have a temperature of less than 200° C., more preferably less than 100° C., even more preferably less than 50° C., and most preferably less than 30° C. Especially preferred flue gas temperatures will thus be in the range of between 10-50° C., 20-70° C., 30-80° C., or 15-90° C.

Suitable $CO_2$ levels in the flue gas may also vary. However, it is generally preferred that the $CO_2$ concentration in the flue gas is between 0.1-2.0 vol %, between 2.0-5.0 vol %, between 5.0-20 vol %, and less typically between 20-50 vol %. Most typically, the $CO_2$ concentration in the flue gas is between 5-20 vol %, or between 10-25 vol %. It should still further be appreciated that where the flue gas was not subject to pre-treatment, such pretreatment may be performed in a separate desublimator. For example, $SO_x$ or $NO_x$ removal may be carried out by desublimation of $SO_x$ or NOx components prior to desublimation of $CO_2$.

Where the flue gas is provided by a flue gas source that is sensitive to back pressure (e.g., turbine combustor), it is generally preferred that the flue gas is boosted to a pressure that is at least the back-pressure of the downstream components (e.g., desublimation columns and heat exchangers), typically between 15-30 psia, more typically between 30-50 psia, and in some cases between 50-150 psia. Where desublimation is performed at elevated pressures, the flue gas may be compressed to such pressures, typically between 25 and 125 psia, as described in more detail below.

It should be appreciated that desublimation is a process of transforming gaseous $CO_2$ into solid $CO_2$ without undergoing a liquid phase transformation. Desublimation is achieved in most typical cases using low pressure and temperature conditions, and the person of ordinary skill in the art will readily be apprised of suitable desublimation conditions with reference to phase diagrams well known in the art (e.g., 2D or 3D phase diagrams, temperature/entropy diagram, pressure enthalpy diagram, etc.). For example, desublimation temperatures for $CO_2$ quantities typically encountered in flue gases will generally be below −90° C., more typically below −100° C., even more typically below −115° C., and most typically below −130° C. where the flue gas pressure is between 15-30 psia. At elevated pressures, the desublimation temperature will rise as can be readily taken from known phase diagrams.

With respect to desublimation devices it is generally contemplated that at least one, but more typically more than one desublimators are used to capture the $CO_2$ from the flue gas and recover the $CO_2$ as solid $CO_2$. It is still further particularly preferred that the desublimators contain a structured packing to more effectively desublimate $CO_2$ and/or to allow for facile regeneration using liquid $CO_2$. However, numerous alternative packing materials that increase the surface area are also contemplated herein, and especially non-porous random packing materials. Porous packing materials are generally less preferred and in most instances even excluded.

Notably, and with further reference to known phase diagrams, $CO_2$ will only desublimate (and not liquefy) at sufficiently low temperatures and low partial pressure, while solid $CO_2$ can be recovered at a later point as liquid $CO_2$ (or as a solid/liquid slurry) at higher pressures and temperatures without generating gaseous $CO_2$. In one especially preferred manner of operation, multiple desublimators are operated in a coordinated cycle in which one desublimator is used for desublimation, another for pre-cooling, a further for recovery of the solid $CO_2$, and yet another one for deep-cooling. Seamless operation of the desublimators may be achieved by use of valves and suitably configured control circuits, wherein the valves open and close with respect to the function of the desublimator (i.e., whether the desublimator is desublimating, deep-cooling, recovering $CO_2$, or pre-cooling).

Furthermore, although the steps in the systems and methods are discussed in a particular order, various alternative sequences and numbers of desublimators are also deemed suitable. For example, it is contemplated that the exit stream of the desublimator which is desublimating the $CO_2$ from the flue gas enters the deep-cooling desublimator so that more $CO_2$ is extracted, or that two separate desublimators are performing the same function of $CO_2$ removal. Likewise, pre-cooling and/or regeneration may be performed on more than one desublimator at a time. Most typically, desublimation is ended in a particular desublimator upon recovery of a predetermined quantity of desublimated $CO_2$, or upon consumption of available cooling necessary for the desublimation of $CO_2$.

Due to the relatively high refrigeration demand for desublimation, it is preferred that the desublimator is cooled in a sequence of steps that include at least one pre-cooling step in which residual refrigeration content from cold $CO_2$-lean flue gas is used as a pre-cooling medium. However, it is contemplated that other process streams may also be used, either in direct contact, or via a heat exchanger and/or heat exchange fluid. Thus, external refrigeration is also deemed suitable to pre-cool the desublimator. Such external cooling may be particularly advantageous where the flue gas is produced from a gas combustion turbine, and where the gas is derived from LNG. For example, regasification of the LNG may be at least in part performed by using the refrigeration content of LNG to pre-/deep-cool the desublimation column, and the so heated LNG may be further warmed prior to combustion (which then produces the $CO_2$ containing flue gas). Depending on the flow rate and temperature demands, it should be appreciated that the $CO_2$-lean flue (or other) gas exiting the pre-cooling desublimator may be further used to cool the flue gas in the flue gas conditioning unit before it enters the desublimator. In addition, the $CO_2$-lean flue (or other) gas may be used to cool any other stream in the process until it has reached approximately ambient temperature (typically 20° C.,+/−10° C.). Using the $CO_2$-lean flue gas to cool streams in the process is more energy efficient since the $CO_2$-lean flue gas is already at a cooler temperature. Therefore, the net result is a conservation of energy, which is highly desirable.

With respect to deep-cooling of a pre-cooled desublimation column, it should be noted that any refrigerant may be used to deep-cool the desublimator and its packing to a temperature suitable to capture $CO_2$ by desublimation. However, it is typically preferred that the refrigeration cycle for deep-cooling is a closed refrigeration cycle that is thermally integrated with the regeneration cycle, and especially with the effluent stream of a regenerating desublimator such that the refrigeration content is conserved within the system. For example, warm pressurized refrigerant of the refrigeration cycle may be cooled by heat exchange with a $CO_2$ slurry mixture from the bottom of a regenerating desublimator, and further cooled by the refrigeration content of a refrigerant stream exiting the desublimator as shown in more detail below. Therefore, it should be recognized that it is possible to substantially reduce the need for external energy in the deep-cooling refrigeration and $CO_2$ regeneration operations.

In regeneration, recovery of solid $CO_2$ is preferably achieved by use of liquid $CO_2$ at high pressure (e.g., between 50-250 psia, between 100-300 psia, or between 250-500 psia) and preferably about ambient temperature (e.g., between 5° C. and 40° C.). However, it is noted that lower temperatures are also deemed suitable. Using liquid CO2 at such pressure and temperature, a portion of the deposited, solid $CO_2$ from desublimation is transformed into a liquid phase $CO_2$ (and in most cases not to gaseous $CO_2$). It should be appreciated that once the desublimator has achieved the requisite high pressure to transform a portion of the solid $CO_2$ into liquid $CO_2$, the liquid $CO_2$ stream can be continuously pumped into the desublimator to recover additional solid $CO_2$. Thus, particularly preferred operating conditions for regeneration of the desublimator are conditions at which $CO_2$ can exist in the liquid and/or solid state but not in the gaseous state.

Therefore, it is generally preferred that the effluent stream of the desublimator during regeneration is a $CO_2$ slurry (i.e., a two-phase system comprising solid and liquid $CO_2$). Most preferably, the effluent stream may exchange heat with a portion of the deep-cooling refrigerant stream such that the effluent stream is heated to melt the slurry (i.e., to reduce or eliminate solid $CO_2$ from the slurry to thereby form a thinner slurry or single-phase $CO_2$ liquid) and such that the refrigeration content from the effluent stream remains within the system by recycling the refrigerant content to the deep-cooling operation. Additionally, one may also choose to heat the effluent stream using another (preferably waste heat) stream from the process in a heat exchanger or using an external energy source. Once enough liquid $CO_2$ is collected, one may choose to purge a portion out of the system by use of a pump to further processing, sale, or final disposition (e.g., sequestration).

Figure 1B:
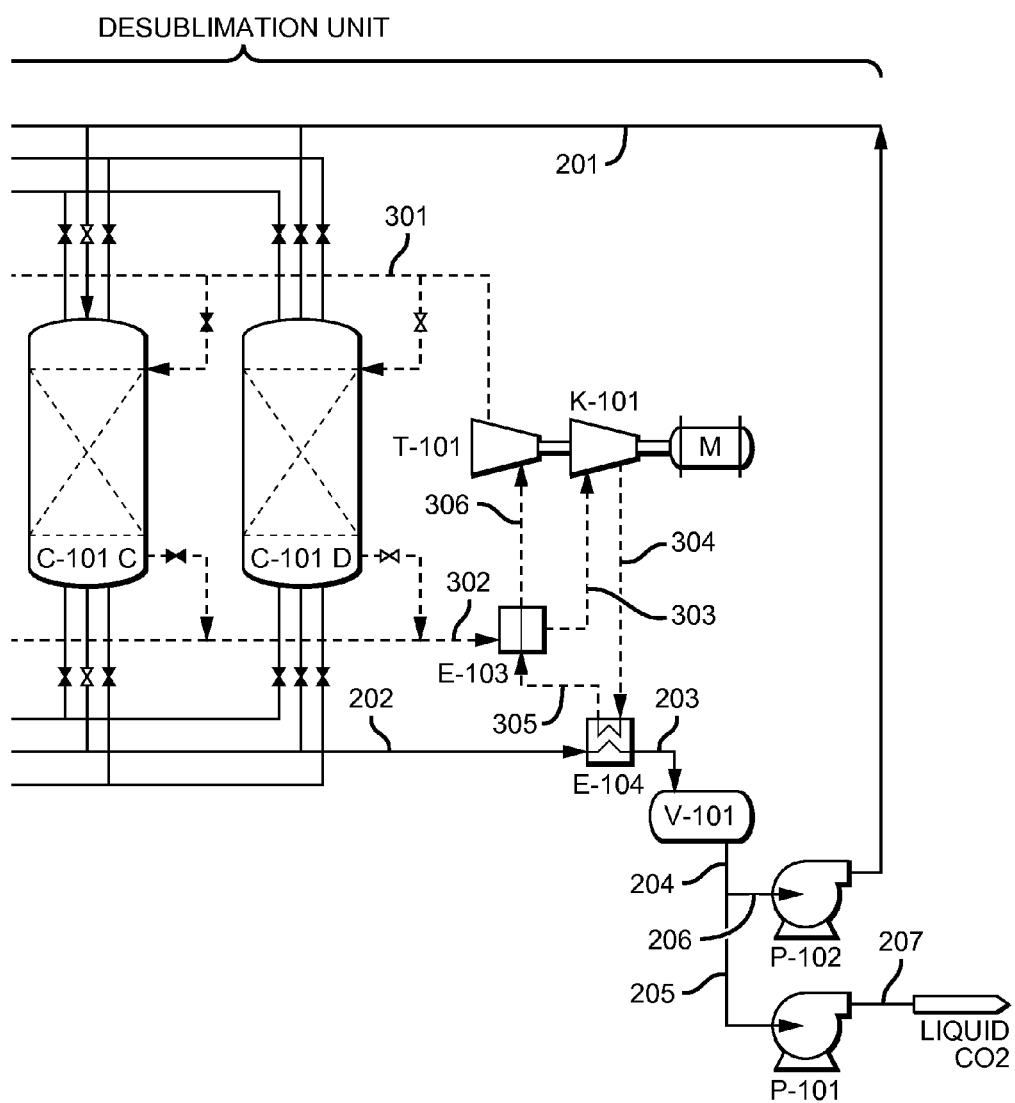

FIGS. 1A & 1B show an exemplary process schematic according to the inventive subject matter. Here, flue gas 101 (typically desulfurized) enters a blower BL-101 or other device to increase pressure of the flue gas. The flue gas typically has a relatively low concentration of $CO_2$, up to approximately 18 vol %. The blower generates a pressurized flue gas stream 102, with a pressure high enough to overcome the pressure drop of the downstream system components to so avoid backpressure on the source of the flue gas.

Pressurized flue gas stream 102 enters first precooler E-101 that is preferably configured as a heat exchanger in which refrigeration content of the cold, $CO_2$ depleted flue gas 109 is used to cool the pressurized flue gas stream 102, thereby forming cooled pressurized flue gas stream 103. Stream 103 is cooled and dried in dryer D-101, which may be a glycol or other suitable gas dryer. Water is removed from the cooled pressurized flue gas as stream 105, forming dry cooled flue gas 104, which enters a second precooler E-102. The second precooler E-102 is preferably configured as a feed-effluent exchanger in which heat is transferred from the dry cooled flue gas 104 to the cool $CO_2$ depleted flue gas 108. The so precooled dry flue gas 106 enters one of a series of desublimators (C-101 A-D).

In FIGS. 1A & 1B, the precooled dry flue gas 106 enters the first desublimator (C-101 A). However, it should be recognized that the precooled dry flue gas could enter any of the four desublimators, depending on the cycling service. Moreover, it should be noted that the flow path in the desublimator can be radial or axial, and that a suitable flow path will be readily determined by the skilled artisan. It is generally preferred that the desublimators are filled with a non-porous material, most preferably having a high surface area to so not significantly impede gas flow through the desublimator. Structured tower packing is especially preferable, but random packing may alternatively be used.

With further reference to FIGS. 1A & 1B, the packing is cooled to a temperature that is below the desublimation temperature of the $CO_2$ (typically at the pressure of the dry cooled flue gas or the precooled dry flue gas) before the start of the desublimation cycle. As the precooled dry flue gas 106 flows up through the packing, it is cooled as it exchanges heat with the packing. Solid $CO_2$ desublimates from the gas and collects on the packing media. The cold $CO_2$-lean flue gas 107 leaves the first desublimator C-101 A, and is routed to a second desublimator C-101 B. The cold $CO_2$-lean flue gas 107 cools the packing in the second desublimator C-101 B and is thereby warmed by the packing media in the second desublimator. After a portion of the refrigeration content is recovered from the $CO_2$-lean flue gas, the gas exits the second desublimator as cool $CO_2$-depleted flue gas 108. Remaining refrigeration content in the cool $CO_2$-depleted flue gas 108 cools the dry cooled feed gas 104 in exchanger E-102, to form $CO_2$-depleted gas 109 that further cools the pressurized flue gas in exchanger E-101 before being vented to the atmosphere as stack gas 110.

After the solid $CO_2$ has been deposited in the first desublimator C-101 A, the solid $CO_2$ must be recovered. In FIGS. 1A & 1B, the recovery of previously desublimated $CO_2$ is performed in a third desublimator C-101 C, which in an earlier cycle operated as desublimator. Here, a high pressure warm liquid $CO_2$ stream 201 enters the third desublimator and flows through the packing media. As the pressure in the $CO_2$ desublimator increases due to contact with the high-pressure warm liquid $CO_2$ stream 201, the solid $CO_2$ in the third desublimator begins to melt. Effluent stream 202 (typically a two-phase stream comprising liquid and solid $CO_2$) is withdrawn from the third desublimator and is heated in the $CO_2$ liquid heater E-104, where the refrigeration content from the effluent stream 202 ($CO_2$ slurry) is recovered. As a result, a combined liquid $CO_2$ is formed and fed as stream 203 to liquid $CO_2$ collection drum V-101. Liquid withdrawn from the liquid $CO_2$ collection drum V-101, stream 204, is split into streams 205 and 206. Stream 206 enters the circulating liquid $CO_2$ pump P-102, while stream 205 enters the $CO_2$ product pump P-101. Stream 206 is pressurized and returned to the desublimator for additional $CO_2$ melting, as high-pressure warm liquid stream 201. Stream 205 is pressurized and pumped to the $CO_2$ end-use destination (e.g., storage, sequestration, etc.), as stream 207.

Before the $CO_2$ is desublimated on the packing media, but after the packing media has been cooled by the depleted flue gas, the packing is cooled below the desublimation temperature of $CO_2$ by a refrigerant. While numerous refrigerants are deemed suitable for use herein, it is especially preferred that the refrigerant comprises dry $N_2$, $O_2$, $CO_2$, air, $CO_2$ depleted flue gas, or any reasonable combination thereof. It should be noted that use of $CO_2$-depleted flue gas as the refrigerant is especially advantageous as that gas is already a dry gas (See FIGS. 2A and 2B, 307 and 308).

Still referring to FIGS. 1A & 1B, cold refrigerant stream 301 enters a fourth desublimator C-101 D for deep-cooling, which was previously subjected to pre-cooling with cold $CO_2$-lean flue gas. The cold refrigerant cools the packing material to decrease the temperature in the desublimator to allow for $CO_2$ desublimation in the next step of the cycle. In turn, the cold refrigerant warms as it pulls heat from the packing material and exits the desublimator as cool refrigerant stream 302. In especially preferred aspects of the inventive subject matter, the remaining refrigeration content in the cool refrigerant 302 is used to cool (typically at least partially condense) chilled pressurized refrigerant 305 in exchanger E-103, thus forming warmed refrigerant stream 303. The so formed warmed refrigerant stream 303 is routed to the refrigeration compressor K-101 where its pressure is increased to yield warm pressurized refrigerant stream 304. The warm pressurized refrigerant stream 304 is then fed to the liquid $CO_2$ heater E-104 to thereby heat the effluent stream and form the chilled pressurized refrigerant 305. As already noted above, the chilled pressurized refrigerant 305 is further cooled in E-103 to form cold pressurized refrigerant stream 306 that is then expanded in the refrigerant expander T-101 and work is produced. The so formed cold refrigerant stream 301 is routed back to the desublimator for deep cooling. Of course, it should be recognized that numerous alternative refrigeration systems may be used in conjunction with the teachings presented herein, and especially suitable systems are described in U.S. Pat. No. 5,483,806 to Miller et al., which is incorporated herein by reference.

Thus, it should be appreciated that the systems and methods of $CO_2$ desublimation of the inventive subject matter provide for heretofore unprecedented cold integration. In especially preferred aspects, residual refrigeration content of cold CO2-lean flue gas is used in a precooling step for a desublimator and flue gas cooling such that the temperature of the CO2-lean flue gas leaving the plant is no less than 0° C., more typically no less than 10° C., even more typically no less than 15° C., and most typically no less than 20° C. Additionally, it should be recognized that refrigeration content of previously desublimated $CO_2$ can be recovered by providing refrigeration duty in a closed refrigeration cycle that is used to deep-cool a desublimation column. Lastly, at least some of the refrigeration content from the closed refrigeration cycle can be recycled by heat exchange of the cool refrigerant stream against the chilled pressurized refrigerant.

Moreover, it should be appreciated that while desublimation is performed at about flue gas pressure, regeneration of the desublimation column is performed at substantially increased pressure to so allow for a phase transition of the solid $CO_2$ to liquid $CO_2$ (and most preferably at a pressure and temperature that allows only for liquid $CO_2$ and solid $CO_2$ but not gaseous $CO_2$ to exist).

Figure 2A:
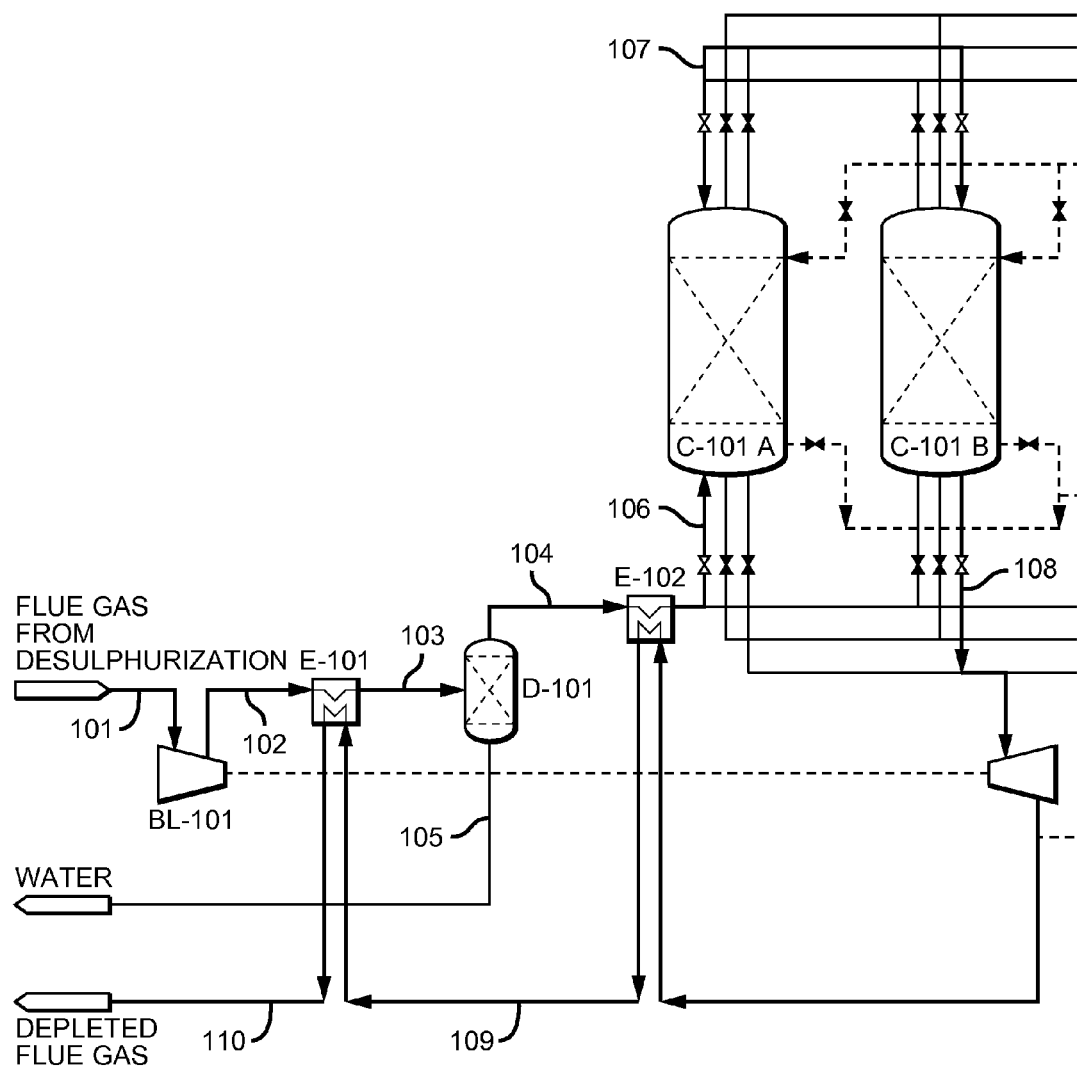
FIGS. 2A & 2B show the exemplary configuration of FIGS. 1A & 1B with flue gas compression/expansion.
Figure 2B:
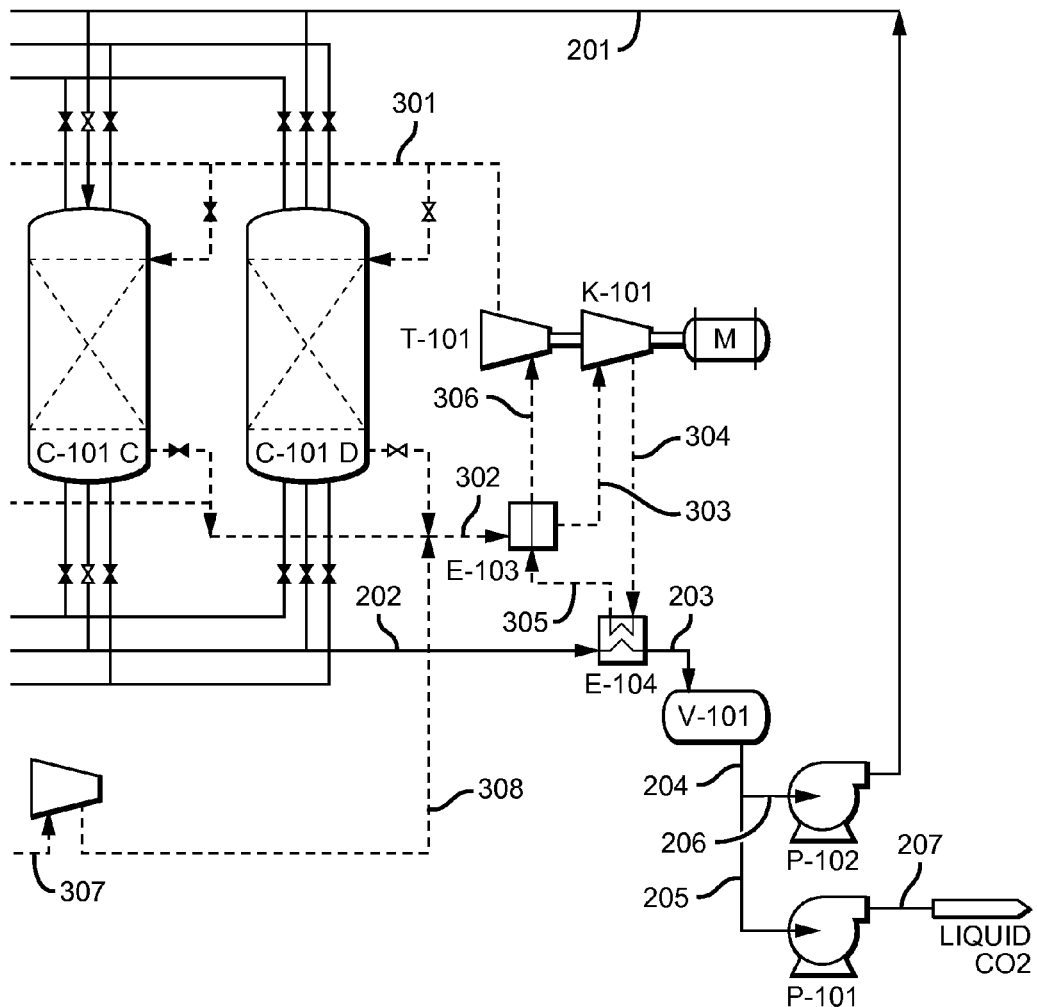

FIGS. 2A & 2B depict a modification of the configuration of FIGS. 1A & 1B, in which desublimation process occurs at an elevated pressure, preferably 25-130 psia. With respect to the numerals in FIGS. 2A & 2B, the same considerations and modifications apply to like components which have like numerals. Here BL-101 provides the elevated pressure (e.g., between 20-150 psia) to the flue gas and so increases the desublimation temperature, which in turn reduces work input required by the refrigeration cycle. Consequently, the total power needed per unit of $CO_2$ captured may be substantially reduced. In such systems and methods, it should be recognized that the energy used to reach the elevated pressure can be recovered using an expander after the $CO_2$-lean gas precools a desublimator (stream 108 into the expander). In such configuration, a portion of the $CO_2$-lean gas may be advantageously used as a refrigerant (via streams 307, 308).

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refer to at least one of something selected from the group consisting of A, B, C . . . and N, the text should be interpreted as requiring only one element from the group, not A plus N, or B plus N, etc.

What is claimed is:

1. A flue gas treatment plant, comprising:
a flue gas conditioning unit configured to cool a flue gas (101) in a heat exchanger using a cool $CO_2$ depleted flue gas (108) to thereby produce a precooled flue gas (106) at a flue gas pressure;
a desublimation unit comprising a plurality of desublimators that are fluidly coupled to each other and the flue gas conditioning unit such that:
  (i) a first of the desublimators is configured to receive the precooled flue gas (106) from the flue gas conditioning unit and to produce a cold $CO_2$-lean flue gas (107) and solid $CO_2$;
  (ii) a second of the desublimators is configured to receive the cold $CO_2$-lean flue gas (107) to thereby pre-cool the second of the desublimators, thereby forming the cool $CO_2$ depleted flue gas (108);
  (iii) a third of the desublimators is configured to receive a liquid $CO_2$ stream (201) at a regeneration pressure and to produce an effluent stream (202);
  (iv) a fourth of the desublimators is coupled to a refrigeration cycle that is configured to deep-cool the fourth of the desublimators to at least a temperature at which $CO_2$ desublimates; and
  (v) wherein the refrigeration cycle is thermally coupled to the effluent stream (202) of the third of the desublimators such that refrigeration content of the effluent stream cools a refrigerant in the refrigeration cycle.

2. The plant of claim 1, wherein the flue gas conditioning unit further comprises a second heat exchanger configured to cool the flue gas (101) using residual refrigeration content of the cool $CO_2$ depleted flue gas (108) leaving the heat exchanger.

3. The plant of claim 1, wherein the flue gas conditioning unit further comprises a dehydrator that is configured to remove water from the flue gas.

4. The plant of claim 1, wherein the refrigeration cycle is a closed refrigeration cycle.

5. The plant of claim 4, wherein the refrigeration cycle uses a portion of the cool $CO_2$ depleted flue gas (108) as a refrigerant.

6. The plant of claim 1, wherein the refrigeration cycle further includes a cross-heat exchanger that is configured to use refrigeration content of a stream leaving the fourth of the desublimators.

7. The plant of claim 1, wherein at least one of the plurality of desublimators comprises a structured packing, a random packing, or a non-porous high surface area material.

8. The plant of claim 1, wherein the flue gas pressure is between 10 and 50 psia and wherein the regeneration pressure is between 100-300 psia.

9. The plant of claim 1, further comprising a control system and a series of valves fluidly coupled to the plurality of desublimators and configured to allow switching of an operational mode of at least one of the desublimators from one of a desublimation mode, a regeneration mode, a pre-cooling mode, and a deep-cooling mode to another one of the desublimation mode, the regeneration mode, the pre-cooling mode, and the deep-cooling mode.

* * * * *